Patented Apr. 29, 1941

2,240,006

UNITED STATES PATENT OFFICE 2,240,006

ESTERS OF HIGH-MOLECULAR POLYCARBOXYLIC ACIDS

Ernest G. Peterson, Wilmington, Del., assignor to Hercules Powder Company, Wilmington, Del., a corporation of Delaware No Drawing. Application March 3, 1938,
Serial No. 193,613

4 Claims. (Cl. 260—75)

This invention relates to rubber-like esters of high-molecular, polycarboxylic acids, and more particularly to high-molecular, complex resin compounds and methods of manufacture thereof.

Many condensation products of terpenes and maleic anhydride are known, as well as polyhydric alcohol esters thereof. Such esters are generally highly viscous or solid resins, depending upon the particular polyhydric alcohol employed in their esterification.

I have found that, by separating various portions of polycarboxylic acid condensation compounds, for example by distillation under reduced pressure, such as for example the condensation compound formed by reacting maleic anhydride with a terpene and esterifying the non-volatile portion with a glycol, more specifically, ethylene glycol, diethylene glycol, triethylene glycol and tetraethylene glycol, or by esterifying undistilled polycarboxylic acid condensation compounds, such as, for example, the condensation compound formed by reacting maleic anhydride with a terpene, with certain long chained glycols, new and useful resinous compositions can be prepared, having properties differing markedly from those resins prepared from the polycarboxylic acid condensation compounds as described in the art.

I have also found that, by esterifying a polycarboxylic acid condensation compound, such as, for example, the condensation compound formed by reacting maleic anhydride with a terpene and containing from about 38% to about 59% of a non-distillable residue with a tri- or tetra-alkylene-polyhydric alcohol, new and useful compositions can be prepared.

The terpene-maleic anhydride condensation compounds which I may employ in accordance with this invention may be, for example, condensation compounds of terpinene-maleic anhydride, pinene-maleic anhydride, dipentene-maleic anhydride, terpinolene-maleic anhydride, cineol-maleic anhydride, etc., produced by condensing maleic anhydride, or equivalently maleic acid, with a suitable terpene in the presence of heat.

Example I

As an example of the carrying out of the process in accordance with this invention, 810 parts by weight of the polycarboxylic acid condensation compound, namely terpinene-maleic anhydride, were heated in an oil bath and distilled at the low pressure of 1 mm. at a temperature of 100–183° C. About 10 parts by weight of free maleic anhydride first passed over, and was discarded by changing the receiver. Then a slight decomposition of the resin occurred, with evolution of uncondensable gas, reducing the vacuum in the apparatus to 4 mm. The temperature remained constant at 173° C. distillation temperature and the pressure at 4 mm. while about 200 parts by weight of product distilled over. The temperature then rose to 181° C. and distillation practically ceased at 200° C., when heating was discontinued. A total of 280 parts by weight of distillate was recovered, comprising a heavy, viscous, yellow oil. The residue in the flask was again subjected to heating and vacuum distillation at a temperature of 280° C. (bath temperature) and the distillate, which passed over slowly, amounted to 133 parts by weight. The residue in the flask comprised a dark colored product, amounting to 337 parts by weight.

Then 115 parts by weight of the residue obtained as above, and 54 parts by weight of ethylene glycol were heated together at a bath temperature of 220–230° C. The mixture was very thick during the heating, and, after heating at the above temperature for a period of about 7 hours, gelation to a rubbery gel occurred, indicating that the terpinene-maleic anhydride residue from the distillation, which gels with glycol more quickly than does undistilled terpinene-maleic anhydride, may consist of an acid higher than dibasic, e. g., it has more than 2 reactive points, having a molecular weight of 353, as compared with the original acid of molecular weight 306. It has a higher molecular weight than undistilled terpinene-maleic anhydride, and this larger molecule may have been formed by polymerization at the double bonds, thereby giving an enlarged molecule of more than two carboxyl groups. Since the iodine number of the residue is much lower and the acid number higher, than on the undistilled terpinene-maleic anhydride or on the volatile fraction, it appears that the residue is more saturated and more highly acidic than the volatile fraction or the undistilled portion.

Example II

As a further example of my invention, 100 parts by weight of distillation residue from distillation of acidic terpinene-maleic anhydride, and 97 parts by weight of tetra-ethylene glycol were heated in an oil bath at 206–210° C. for 4 hours, whereupon the mixture gelatinized. The acid number of the mixture was 61 after heating for 3¾ hours. The gelled resin is a tough, rubbery solid.

Example III

As a further example of my invention, using a terpene other than terpinene, I heated about 400 parts by weight of dipentene and about 200 parts by weight of maleic anhydride to about 190° C. under an air-cooled reflux condenser for about 3 hours, removed excess dipentene by heating the reaction mass to 205° C. and a pressure of 15 mm. of mercury, producing a resin of color 76A (on the Lovibond scale), melting at 52.5° C. (Hercules drop method) and having an acid number (in pyridine) of 502. This resin was then distilled under a pressure of 3 mm. of mercury at a temperature of 158–186° C., leaving 43% by weight of undistilled residue of acid number 540 (in pyridine).

About 104 parts by weight of the above undistilled residue were reacted with 100 parts by weight of tetraethylene glycol under a blanket of carbon dioxide and under a reflux condenser, at 220° C. for about 2¾ hours. A soft, elastic, rubber-like resin was produced.

Example IV

Similarly, about 400 parts by weight of terpinolene and 200 parts by weight of maleic anhydride were heated under an air-cooled reflux condenser at 190° C. for 3 hours, the excess terpinolene removed by heating to 205° C. under 15 mm. mercury pressure, and an acidic resin produced having a melting point (Hercules drop method) of 46° C., color 44A (on the Lovibond scale) and an acid number of 518 (in pyridine). The acidic product was distilled as in the preceding example, forming about 38% by weight of distillation residue, acid number 564 (in pyridine). About 49 parts by weight of the non-volatile residue were reacted with about 108 parts by weight of triethylene glycol and about 136 parts by weight of linseed oil fatty acids by heating the reactants together at 220° C. for about 6 hours. No gelation took place. The finished resin had an acid number of 14 and a curing time of 80 seconds at 200° C. It was a soft, balsam-like, highly flexible, amber-colored resin.

Example V

Similarly about 400 parts by weight of gum turpentine (mainly pinene) and 200 parts by weight of maleic anhydride were heated under an air-cooled reflux condenser to 180–190° C. for 3 hours, the excess turpentine removed by heating to 205° C. under 15 mm. mercury pressure, and an acidic product having an opaque appearance, a melting point of 99° C., (Hercules drop method) and an acid number of 479 (in pyridine) obtained.

The above product was distilled as before, giving about 59% by weight of non-volatile residue. One hundred parts by weight of the non-volatile residue, 108 parts by weight of triethylene glycol and 136 parts by weight of linseed oil fatty acids were heated together under an air-cooled reflux condenser at a temperature of 212–216° C. Gelation occurred after heating for 1 hour. The product was a soft, elastic, rubber-like resin.

Where, in the specification and claims hereof, I refer to maleic anhydride, it will be understood that I mean to include equivalent maleic acid.

It will be understood that the above examples are illustrative only and not limiting my broad invention, and that any suitable apparatus, or equipment, may be used in the practice of my invention.

What I claim and desire to protect by Letters Patent is:

1. The process of producing a rubbery, gelled synthetic resin which comprises reacting a terpene with maleic anhydride, distilling off the volatile portion of the product so formed to separate a non-volatile residue, and heating the said non-volatile residue with a glycol for a period of time sufficient to reach the gelled state.

2. The rubbery, gelled synthetic resin produced in accordance with the process of claim 1.

3. The process of producing a rubbery, gelled synthetic resin which comprises reacting a terpene with maleic anhydride, distilling off the volatile portion of the product so formed to separate a non-volatile residue, and heating the non-volatile residue with diethylene glycol for a period of time sufficient to reach the gelled state.

4. The rubbery, gelled synthetic resin produced in accordance with the process of claim 3.

ERNEST G. PETERSON.